United States Patent
Guo

(10) Patent No.: US 12,207,143 B2
(45) Date of Patent: Jan. 21, 2025

(54) USER EQUIPMENT AND METHOD OF UPLINK BEAM MANAGEMENT

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 310 days.

(21) Appl. No.: 17/581,494

(22) Filed: Jan. 21, 2022

(65) Prior Publication Data

US 2022/0217590 A1  Jul. 7, 2022

Related U.S. Application Data

(63) Continuation of application No. PCT/CN2019/126301, filed on Dec. 18, 2019.

(51) Int. Cl.
  H04W 92/20  (2009.01)
  H04L 5/00  (2006.01)
  H04W 36/00  (2009.01)

(52) U.S. Cl.
  CPC ....... *H04W 36/0058* (2018.08); *H04L 5/0051* (2013.01); *H04W 36/0072* (2013.01); *H04W 36/00725* (2023.05)

(58) Field of Classification Search
  USPC .... 455/437, 522, 452.1, 436, 458, 354, 3.02
  See application file for complete search history.

(56) References Cited

U.S. PATENT DOCUMENTS

| | | | |
|---|---|---|---|
| 2017/0230869 A1 | 8/2017 | Kubota et al. | |
| 2017/0331577 A1 | 11/2017 | Parkvall et al. | |
| 2018/0324715 A1* | 11/2018 | Ryoo | H04L 5/0007 |
| 2019/0104549 A1* | 4/2019 | Deng | H04W 72/0453 |
| 2020/0084674 A1 | 3/2020 | Kubota et al. | |

(Continued)

FOREIGN PATENT DOCUMENTS

| CN | 108347766 A | 7/2018 |
|---|---|---|
| CN | 109392044 A | 2/2019 |

(Continued)

OTHER PUBLICATIONS

Ericsson, "Further details of handover execution in NR", 3GPP TSG-RAN WG2#99 Tdoc R2-1707857, Aug. 21-25, 2017, the whole document, 5 pages.

(Continued)

*Primary Examiner* — Joseph Arevalo
(74) *Attorney, Agent, or Firm* — PERKINS COIE LLP

(57) ABSTRACT

A user equipment (UE) and a method of uplink beam management are provided. The method includes being configured, by a source cell, an uplink transmit beam for an uplink transmission for a target cell and transmitting, to the target cell, the configured uplink transmit beam for the uplink transmission. During a handover from the source cell to the target cell, the uplink transmit beam for the UE to the target cell is determined based on collaboration between the source cell and the target cell. The method enables a random access channel-free (RACH-free) handover procedure which reduces latency of handover and overhead of signaling and resource.

12 Claims, 10 Drawing Sheets

(56) References Cited

U.S. PATENT DOCUMENTS

| | | | |
|---|---|---|---|
| 2020/0267609 A1* | 8/2020 | Ly | H04W 36/0085 |
| 2021/0068161 A1* | 3/2021 | Takahashi | H04W 74/0833 |
| 2022/0116979 A1* | 4/2022 | Park | H04L 5/0044 |

FOREIGN PATENT DOCUMENTS

| | | |
|---|---|---|
| TW | 201832606 A | 9/2018 |
| TW | 201927053 A | 7/2019 |
| WO | 2017196246 A2 | 11/2017 |
| WO | 2019108114 A1 | 6/2019 |

OTHER PUBLICATIONS

Notice of Allowance of the Chinese application No. 201980008100.X, issued on Nov. 20, 2023, 6 pages with English translation.

Intel Corporation, "Summary of discussions on physical layer aspects of enhanced mobility", 3GPP TSG RAN WG1 Meeting #97 R1-1907800, Reno, USA, May 13-17, 2019. 9 pages.

Supplementary European Search Report in European application No. 19938941.2, mailed on Jul. 12, 2022. 10 pages.

Second Office Action of the Chinese application No. 201980008100.X, issued on May 27, 2023. 11 pages with English translation.

OPPO. "Discussion on RACH-less Handover for NR"3GPP TSG-RAN WG2#101 R2-1801786, Mar. 2, 2018 (Mar. 2, 2018), Sections 2-3.

International Search Report in the international application No. PCT/CN2019/126301, mailed on Apr. 22, 2020.

Written Opinion of the International Search Authority in the international application No. PCT/CN2019/126301, mailed on Apr. 22, 2020.

First Office Action of the Chinese application No. 201980008100.X, issued on Nov. 3, 2022. 13 pages with English translation.

First Office Action of the European application No. 19938941.2, issued on Aug. 20, 2024, 8 pages.

* cited by examiner

USER EQUIPMENT AND METHOD OF UPLINK BEAM MANAGEMENT

CROSS-REFERENCE TO RELATED APPLICATIONS

The application is a continuation application of PCT Application No. PCT/CN2019/126301 filed on Dec. 18, 2019, which claims priority to U.S. provisional application No. 62/876,968 filed on Jul. 22, 2019. The disclosures of these applications are hereby incorporated by reference in their entirety.

BACKGROUND OF DISCLOSURE

1. Field of Disclosure

The present disclosure relates to the field of communication systems, and more particularly, to a user equipment (UE) and a method of uplink beam management during a handover procedure.

2. Description of Related Art

In current designs of handover procedures, to build a connection with a target cell, a user equipment (UE) first measures resource or synchronization signal/physical broadcast channel (SS/PBCH) blocks transmitted by the target cell and then performs a random access procedure to the target cell. Through the random access procedure to the target cell, the UE can obtain an initial uplink transmit beam for an uplink transmission to the target cell. The initial uplink transmit beam for the uplink transmission is for example, physical uplink shared channel (PUSCH) and physical uplink control channel (PUCCH) for hybrid automatic repeat request acknowledgement/non-acknowledgement (HARQ ACK/NACK) feedback. A drawback is the UE has to measure all the SS/PBCH blocks and operate the full random-access procedure. The consequent is large latency and excessive resource requirement.

Therefore, there is a need for a user equipment (UE) and a method of uplink beam management during a handover procedure.

SUMMARY

An object of the present disclosure is to propose a user equipment (UE) and a method of uplink beam management during a handover procedure capable of providing a random access channel-free (RACH-free) operation, which can reduce latency and overhead of signaling and resource in a handover procedure.

In a first aspect of the present disclosure, a method of uplink beam management of a user equipment (UE) includes being configured, by a source cell, an uplink transmit beam for an uplink transmission for a target cell and transmitting, to the target cell, the configured uplink transmit beam for the uplink transmission.

In a second aspect of the present disclosure, a user equipment (UE) of uplink beam management includes a memory, a transceiver, and a processor coupled to the memory and the transceiver. The processor is configured to be configured, by a source cell, with an uplink transmit beam for an uplink transmission for a target cell and the processor is configured to control the transceiver to transmit, to the target cell, the configured uplink transmit beam for the uplink transmission.

In a third aspect of the present disclosure, a non-transitory machine-readable storage medium has stored thereon instructions that, when executed by a user equipment (UE), cause the UE to perform operations of: being configured, by a source cell, an uplink transmit beam for an uplink transmission for a target cell; and transmitting, to the target cell, the configured uplink transmit beam for the uplink transmission.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
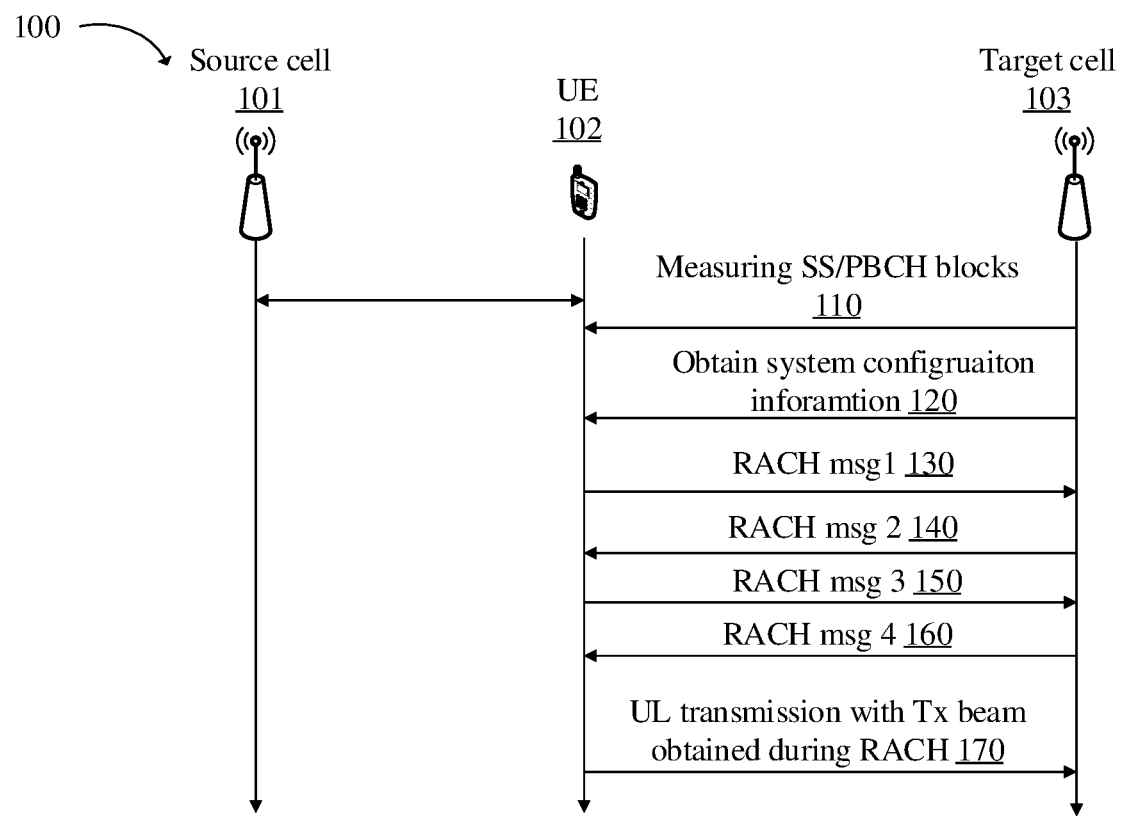
FIG. 1 is a flowchart illustrating a handover operation performed by a user equipment (UE) from a source cell to a target cell.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Fifth-generation (5G) wireless systems are generally a multi-beam based system in a frequency range 2 (FR2) ranging from 24.25 GHz to 52.6 GHz, where multiplex transmit (Tx) and receive (Rx) analog beams are employed by a base station (BS) and/or a user equipment (UE) to combat a large path loss in a high frequency band. In a high frequency band system, for example, mmWave systems, the BS and the UE are deployed with large number of antennas, so that a large gain beamforming can be used to defeat the large path loss and signal blockage. Due to the hardware limitation and cost, the BS and the UE might only be equipped with a limited number of transmission and reception units (TXRUs). Therefore, hybrid beamforming mechanisms can be utilized in both BS and UE. To get the best link quality between the BS and the UE, the BS and the UE need to align analog beam directions for a particular downlink or uplink transmission. For a downlink transmission, the BS and the UE need to find the best pair of a BS Tx beam and a UE Rx beam while for an uplink transmission, the BS and the UE need to find the best pair of the UE Tx beam and the BS Rx beam.

For a communication between one UE and a BS, the BS and the UE need to determine which Tx and Rx beam are going to be used. When one UE moves, the beams used by the BS and the UE for communication might change. In 3GPP 5G specification, the following functions are defined to support such multi-beam-based operation.

At an operation associated with beam measurement and reporting, in this function, the UE can measure one or multiple Tx beams of the BS and then the UE can select the best Tx beam and report his selection to the BS. By measuring the Tx beams of the BS, the UE can also measure one or more different Rx beams and then select the best Rx beam for one particular Tx beam of the BS. In this function, the gNB can also measure one or multiple Tx beams of the UE and then select the best Tx beam of the UE for an uplink transmission. To support measuring Tx beams of the BS, the BS can transmit multiple reference signal (RS) resources and then configures the UE to measure the RS resources. Then, the UE can report an index of one or more selected RS resources that are selected based on some measure metric, for example, a layer 1 reference signal received power (L1-RSRP). To support measuring Tx beams of the UE used for an uplink transmission, the BS can configure the UE to transmit one or more uplink RS resources, for example, sounding reference signal (SRS) resources, and then the BS can measure the RS resources. The BS can figure out which Tx beam of the UE is the best for the uplink transmission based on measuring, for example, L1-RSRP of the RS resources.

At an operation associated with beam indication, for a downlink transmission, the BS can indicate the UE of which Tx beam of the BS is used to transmit, so that the UE can use proper Rx beam to receive the downlink transmission. For a physical downlink control channel (PDCCH) transmission, the BS can indicate an identify (ID) of one Tx beam of the BS to the UE. For a physical sidelink discovery channel (PSDCH) transmission, the BS can use downlink control information (DCI) in a PDCCH to indicate the ID of one Tx beam that is used to transmit a corresponding PDSCH. For an uplink transmission from the UE, the BS can also indicate the UE of which Tx beam of the UE to be used. For example, for a physical uplink control channel (PUCCH) transmission, the UE uses a Tx beam that is indicated by the BS through a configuration of spatial relation information. For an SRS transmission, the UE uses the Tx beam that is indicated by the BS through the configuration of spatial relation information. For a physical uplink shared channel (PUSCH) transmission, the UE uses a Tx beam that indicated by an information element contained in a scheduling DCI.

At an operation associated with beam switch, this function is used by the BS to switch a Tx beam used for a downlink or uplink transmission. This function is useful when the Tx beam used for transmission currently is out of date due to for example a movement of the UE. When the BS finds a Tx beam currently used for a downlink transmission is not good or the BS finds another Tx beam that is better than the current Tx beam, the BS can send signaling to the UE to inform a change of Tx beam. Similarly, the BS can switch an uplink Tx beam of the UE used to transmit some uplink transmission.

In a new radio (NR) system, multi-transmission/reception point (TRP) transmission is introduced. In a multi-TRP NR system, a backhaul connection between TRPs can be ideal or non-ideal. When the backhaul connection is ideal, low-latency and real-time collaboration between TRPs can be implemented and the TRP can collaborate dynamically for every single physical downlink shared channel (PDSCH) transmission. In contrast, in the system with non-ideal backhaul, it can only implement semi-static collaboration between TRPs and the TRP can only exchange some semi-static configuration information, for example radio resource control (RRC) configurations. However, for each PDSCH transmission, the TRP can only schedule and control the PDSCH separately and independently.

The TRPs can schedule and control the transmission to the same UE separately. Each TRP can send a DCI to schedule PDSCH transmission independently. The UE receives DCI from each of the TRPs and then decodes the PDSCH as indicated by that DCI. An example is for a NR multi-TRP system with two TRPs. The TRP 1 sends DCI 1 to schedule PDSCH 1 to the UE and the TRP 2 sends DCI 2 to schedule PDSCH 2 to the UE. The TRP 1 and TRP 2 can be configured with different CORESET and different search space for PDCCH transmission. The UE can detect PDCCH in different CORESET and search space for the DCI sent by different TRPs. The UE is configured with multiple CORESETs and some of the CORESETs are used by TRP 1 and some of the CORESETs are used by TRP2.

FIG. 1 illustrates a handover operation performed by a user equipment (UE) from a source cell to a target cell. In a current design, to handover from a source cell to a target cell, the UE would have to conduct the whole initial access and random-access procedure to obtain transmit beam information for uplink transmission. An example of the current design is shown in is illustrated in FIG. 1, where a UE handover from a source cell to a target cell. Before the UE transmit uplink transmission to the target cell, the UE can know which uplink transmit beam can be used for uplink transmission, for example PUSCH and the target cell also should know which uplink transmit beam is used by the UE. As illustrated in FIG. 1, the UE first measures the SS/PBCH blocks of the target cell to find the 'best' SS/PBCH block for access and also decodes the master system information of the target cell. Then the UE can further obtain more system configuration information for random-access channels. After that, the UE conducts the random access procedure to the target cell. During the random access procedure, the UE can obtain the initial Tx beam used for uplink transmission and the initial quasi co-location assumption for downlink transmission from the target cell. Specifically, for uplink transmission to the target cell, the UE uses the same transmit beam as the one applied to the RACH msg3 that is successfully received by the target cell. For reception of downlink transmission from the target cell, the UE assumes a demodulation reference signal (DM-RS) of the PDSCH and PDCCH is quasi co-located with the SS/PBCH block that is identified by the UE during the initial access and random access to the target cell.

In some embodiments, a handover operation 100 performed by a user equipment (UE) 102 from a source cell 101 to a target cell 103 is illustrated in FIG. 1. The handover operation 100 includes: at an operation 110, the target cell 103 transmits measuring SS/PBCH blocks to the UE 102, at an operation 120, the UE 102 obtains system configuration information form the target cell 103, at an operation 130, the UE 102 transmits RACH message 1 to the target cell 103, at an operation 140, the target cell 103 transmits RACH message 2 to the UE 102, at an operation 150, the UE 102 transmits RACH message 3 to the target cell 103, at an operation 160, the target cell 103 transmits RACH message 4 to the UE 102, and at an operation 170, the UE 102 transmits system configuration information to the target cell 103.

In a communication system, such as a new radio (NR) system, DL signals can include control signaling conveying DCI through a PDCCH, data signals conveying information packet through a PDSCH and some types of reference signals. The DCI can indicate information of how the PDSCH is transmitted, including for example resource allocation and transmission parameters for the PDSCH. The BS can transmit one or more types of reference signals for different purposes, including a demodulation reference symbol (DM-RS) that is transmitted along with the PDSCH and can be used by the UE to demodulate the PDSCH, a channel state information reference signal (CSI-RS) that can be used by the UE to measure BS's Tx beam or CSI of a downlink channel between the BS and the UE, a phase tracking reference signal (PT-RS) that is also transmitted along with a PDSCH and can be used by the UE to estimate a phase noise caused by imperfection in a radio frequency (RF) part in a transmitter and a receiver and then compensate it when decoding the PDSCH. In NR, DL resource allocation for PDCCH, PDSCH, and reference signals is performed in a unit of orthogonal frequency division multiplexing (OFDM) symbols and a group of physical resource blocks (PRBs). Each PRB contains a few resource elements (REs), for example 12 REs, in a frequency domain. A transmission bandwidth (BW) of one downlink transmission consists of frequency resource unit called as resource blocks (RBs) and each RB consists of a few subcarriers or REs, for example, 12 subcarriers or 12 REs.

UL signals transmitted by the UE to the BS can include data signals conveying data packet through a PUSCH, uplink control signals conveying UL control information (UCI) which can be transmitted in the PUSCH or a PUCCH, and UL reference signals. The UCI can carry a schedule request (SR) used by the UE to request an uplink transmission resource, a hybrid automatic repeat request acknowledgement (HARQ-ACK) feedback for a PDSCH transmission or a channel state information (CSI) report. The UE can transmit one or more types of uplink reference signals for different purposes, including DM-RS that is transmitted along with a PUSCH transmission and can be used by the BS to demodulate the PUSCH, PT-RS that is also transmitted along with a PUSCH and can be used by the BS to estimate the phase noise caused by imperfection in RF parts and the BS then can compensate it when decoding PUSCH, and SRS signals that are used by the BS to measure one or more UE Tx beams or CSI of the uplink channel between the UE and the BS. Similarly, UL resource allocation for PUSCH, PUCCH, and UL reference signal is also performed in a unit of symbols and a group of PRBs.

A transmission interval for DL or UL channels/signals is referred to as a slot and each slot contains a few, for example 14, symbols in time domain In a NR system, the duration of one slot can be 1, 0.5, 0.25 or 0.123 millisecond, for the subcarrier spacing 15 KHz, 30 KHz, 60 KHz, and 120 KHz, respectively. NR systems support flexible numerologies and an embodiment can choose proper OFDM subcarrier spacing based on the deployment scenario and service requirement. In the NR system, DL and UL transmission can use different numerologies.

In new radio (NR) 3GPP specification release 15, a beam indication is conducted per PUCCH resource. For a given uplink bandwidth part (BWP) in a serving Cell, a UE can be configured with 4 PUCCH resource set and in each PUCCH resource set, the UE is configured with one or more PUCCH resources. For a transmission on each PUCCH resource, the UE is configured with a parameter PUCCH-spatialRelationInfo, which can contain one or more reference signal resource ID(s). Each of those reference signal resource is used to provide information on which transmit beam the UE can use for the transmission on that PUCCH resource. For example, if the reference signal resource is a sounding reference signal (SRS) resource, the UE can use the same Tx beam used to transmit that SRS resource on the transmission on that PUCCH resource. If the reference signal resource is a channel state information reference signal (CSI-RS) resource or synchronization signal/physical broadcast channel (SS/PBCH) block, the UE can use the uplink Tx beam corresponding to the receive beam used to receive the CSI-RS resource transmission or SS/PBCH block transmission on the transmission on that PUCCH resource. A gNB can configure only one PUCCH-spatialRelationInfo to a PUCCH resource and when the gNB wants to switch the Tx beam of that PUCCH resource, the gNB can re-configure a radio resource control (RRC) parameter. The gNB can also configure multiple PUCCH-spatialRelationInfo to a PUCCH resource in RRC and then use medium access control element (MAC CE) signaling to activate one of those configured PUCCH-spatialRelationInfo as the current Tx beam for that PUCCH resource. If the gNB wants to switch the Tx beam of one PUCCH resource, the gNB can use one MAC CE message to indicate another PUCCH-spatialRelationInfo for that PUCCH resource. The gNB can use MAC CE message to indicate the PUCCH-spatialRelationInfo for each individual PUCCH resource. The advantage of that method is flexibility and the gNB is allowed to applied different Tx beams on different PUCCH resources.

For PUSCH scheduled by DCI format 0_0 on a cell, the UE can be requested to transmit that PUSCH according to the spatial relation corresponding to the dedicated PUCCH resources with the lowest ID within the UL BWP of the cell. In other word, if the UE is scheduled with a PUSCH transmission by a DCI format 0_0 in one UL BWP, the UE can use the Tx beam configured to the PUCCH with lowest PUCCH resource ID in the same UL BWP to transmit that PUSCH.

In 3GPP release 16, the Tx beam indication/updating for PUCCH resource will be changed to per PUCCH group. In one UL BWP, all the PUCCH resource can be divided into one or two groups. Use case for one group is single TRP transmission and use case for two group is multi-TRP transmission. Every TRP can schedule a PUSCH transmission for a user equipment (UE) and the UE can apply different Tx beam accordingly.

Figure 2:
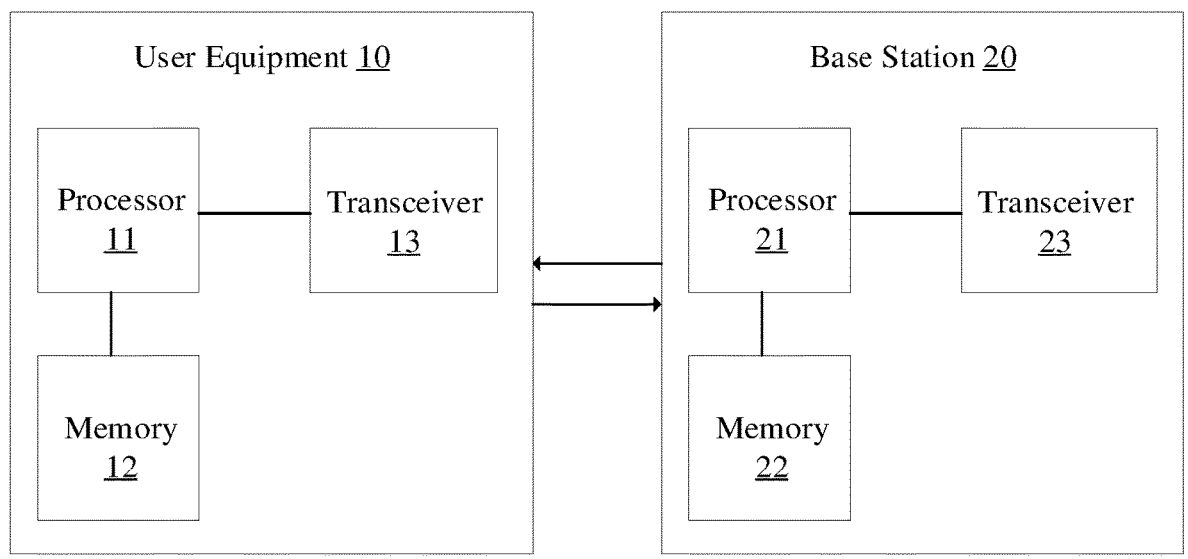
FIG. 2 is a block diagram of a user equipment (UE) and a base station of uplink beam management during a handover procedure according to an embodiment of the present disclosure.

FIG. 2 illustrates that, in some embodiments, a user equipment (UE) 10 and a base station 20 of a fallback physical uplink shared channel (PUSCH) transmission according to an embodiment of the present disclosure are provided. The UE 10 may include a processor 11, a memory 12, and a transceiver 13. The base station 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

In some embodiments, the processor 11 is configured to be configured, by a source cell, with an uplink transmit beam for an uplink transmission for a target cell and the processor 11 is configured to control the transceiver 13 to transmit, to the target cell, the configured uplink transmit beam for the uplink transmission. During a handover from the source cell to the target cell, the uplink transmit beam for the UE 10 to the target cell is determined based on collaboration between the source cell and the target cell. The UE 10 enables a random access channel-free (RACH-free) handover procedure which reduces latency of handover and overhead of signaling and resource.

In some embodiments, the processor 11 is configured to be configured, by the source cell, with an uplink beam sweeping through transmission of sounding reference signal (SRS) resources before the processor 11 is configured to be configured, by the source cell, with the uplink transmit beam for the uplink transmission for the target cell. In some embodiments, the processor 11 configured to be configured, by the source cell, with the uplink beam sweeping through the transmission of the SRS resources includes wherein the processor 11 configured to be configured, by the source cell, with an uplink reference signal for an uplink transmit beam measurement. In some embodiments, the processor 11 configured to be configured, by the source cell, with the uplink beam sweeping through the transmission of the SRS resources further includes the processor 11 configured to be indicated, by the source cell, to transmit, to the target cell, the configured uplink reference signal for the uplink transmit beam measurement. In some embodiments, the transceiver 13 is configured to transmit, to the target cell, the configured uplink reference signal for the uplink transmit beam measurement after the processor 11 configured to be configured, by the source cell, with the uplink reference signal for the uplink transmit beam measurement. In some embodiments, the transceiver 13 is configured to receive a configuration of SRS transmission from the target cell through the source cell after the transceiver 13 is configured to transmit, to the target cell, the configured uplink transmit beam for the uplink transmission. In some embodiments, the processor 11 is configured to change a connection with the source cell to a connection with the target cell through a handover procedure. In some embodiments, the processor 11 is configured to align transmit beams used for at least one of a downlink transmission and an uplink transmission between the target cell and the UE 10 for communication between the UE 10 and the target cell.

In some embodiments, the transceiver 13 configured to transmit, to the target cell, the configured uplink transmit beam for the uplink transmission comprises when the transceiver 13 receives a grant signaling from the source cell or the target cell that grants the uplink transmission to the target cell, the transceiver 13 transmits the uplink transmission with the configured uplink transmit beam according to the grant signaling. In some embodiments, the uplink transmit beam can be indicated by a downlink reference signal. In some embodiments, the processor 11 is configured to derive the uplink transmit beam based on a correspondence between UE receive beams and UE transmit beams. In some embodiments, the processor 11 is configured to be configured, by the source cell, to measure the uplink transmit beam and then report one or more selected best transmit beams of the target cell to the source cell. In some embodiments, the processor 11 is configured to be configured, by the source cell, the downlink reference signal as the uplink transmit beam for the uplink transmission from the UE 10 to the target cell. In some embodiments, the processor 11 is configured to use the same uplink transmit beam as the one used for a physical uplink control channel (PUCCH) transmission to the target cell for a physical uplink shared channel (PUSCH) transmission scheduled by a downlink control information (DCI) format. In some embodiments, the DCI format includes a DCI format 0_0. In some embodiments, the transceiver 11 is configured to receive a command signaling to schedule the PUSCH transmission from the source cell and transmit, to the target cell, the command signaling to schedule the PUSCH transmission.

Figure 3:
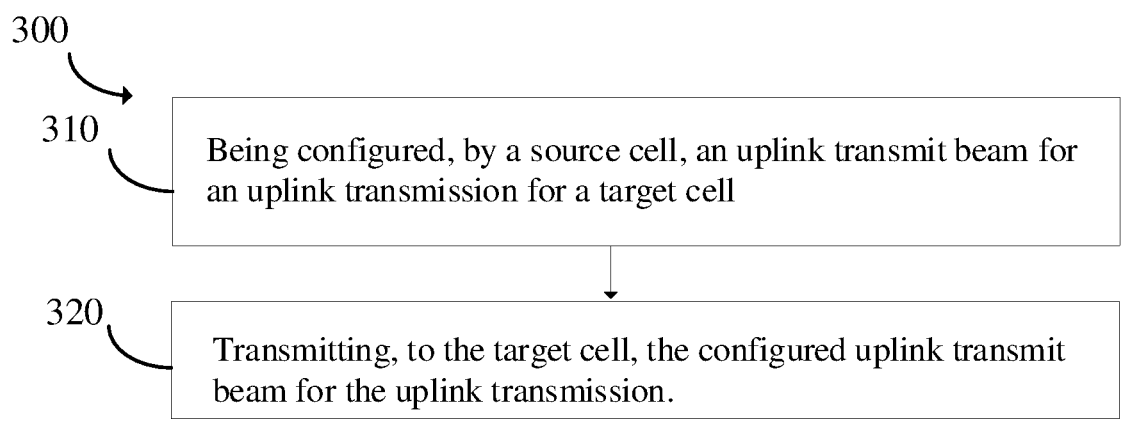
FIG. 3 is a flowchart illustrating a method of uplink beam management during a handover procedure of a UE according to an embodiment of the present disclosure.

FIG. 3 illustrates a method 300 of uplink beam management during a handover procedure of a UE according to an embodiment of the present disclosure. The method 300 includes: a block 310, being configured, by a source cell, an uplink transmit beam for an uplink transmission for a target cell, and a block 320, transmitting, to the target cell, the configured uplink transmit beam for the uplink transmission. During a handover from the source cell to the target cell, the uplink transmit beam for the UE to the target cell is determined based on collaboration between the source cell and the target cell. The method enables a random access channel-free (RACH-free) handover procedure which reduces latency of handover and overhead of signaling and resource.

In some embodiments, the method further includes being configured, by the source cell, an uplink beam sweeping through transmission of sounding reference signal (SRS) resources before being configured, by the source cell, the uplink transmit beam for the uplink transmission for the target cell. In some embodiments, being configured, by the source cell, the uplink beam sweeping through the transmission of the SRS resources includes being configured, by the source cell, an uplink reference signal for an uplink transmit beam measurement. In some embodiments, being configured, by the source cell, the uplink beam sweeping through the transmission of the SRS resources further includes being indicated, by the source cell, to transmit, to the target cell, the configured uplink reference signal for the uplink transmit beam measurement.

In some embodiments, the method further includes transmitting, to the target cell, the configured uplink reference signal for the uplink transmit beam measurement after being configured, by the source cell, the uplink reference signal for the uplink transmit beam measurement. In some embodiments, the method further includes receiving a configuration of SRS transmission from the target cell through the source cell after transmitting, to the target cell, the configured uplink transmit beam for the uplink transmission. In some embodiments, the method further includes the UE changing a connection with the source cell to a connection with the target cell through a handover procedure. In some embodiments, the method further includes aligning transmit beams used for at least one of a downlink transmission and an uplink transmission between the target cell and the UE for communication between the UE and the target cell.

In some embodiments, transmitting, to the target cell, the configured uplink transmit beam for the uplink transmission includes when the UE receives a grant signaling from the source cell or the target cell that grants the uplink transmission to the target cell, the UE transmits the uplink transmission with the configured uplink transmit beam according to the grant signaling. In some embodiments, the uplink transmit beam can be indicated by a downlink reference signal. In some embodiments, the method further includes deriving the uplink transmit beam based on a correspondence between UE receive beams and UE transmit beams. In some embodiments, the method further includes being configured, by the source cell, to measure the uplink transmit beam and then report one or more selected best transmit beams of the target cell to the source cell. In some embodiments, the method further includes being configured, by the source cell, the downlink reference signal as the uplink transmit beam for the uplink transmission from the UE to the target cell. In some embodiments, the method further includes using the same uplink transmit beam as the one used for a physical uplink control channel (PUCCH) transmission to the target cell for a physical uplink shared channel (PUSCH) transmission scheduled by a downlink control information (DCI) format. In some embodiments, the DCI format includes a DCI format 0_0. In some embodiments, the method further includes receiving a command signaling to schedule the PUSCH transmission from the source cell and transmitting, to the target cell, the command signaling to schedule the PUSCH transmission.

In some embodiments of the present disclosure, methods of uplink beam management during handover procedure are proposed. In some embodiments of the present disclosure, a 'beam' can correspond to a reference signal (RS) resource, which can be a channel state information reference signal (CSI-RS) resource, an SRS resource, a SS/PBCH block, or any other type of RS. A UE is serving by a source cell. According to some measurement, the UE changes a connection with the source cell to a connection with a target cell through a handover procedure. For the communication between the UE and the target cell, the UE and the target cell need to align the transmit beams used for downlink and uplink transmission between the target cell and the UE.

In one embodiment, the source cell can send a configuration of uplink reference signal for uplink beam measurement to the target cell so that the target cell can measure one or more UE uplink transmit beams and the source cell can indicate the UE to transmit reference signals for one or more one uplink transmit beams so that target cell can measure them. After measuring the reference signal sent by the UE, the target cell can pick the 'best' one or more UE uplink transmit beams and reports them to the source cell. Then the source cell can configure the Tx beam information for the uplink transmission from the UE to the target cell. When receiving grant signaling from the source cell or target cell that grants a uplink transmission to the target cell, the UE transmits the uplink transmission with the transmit (Tx) beam configured by the source cell according the uplink grant command.

Figure 4A:
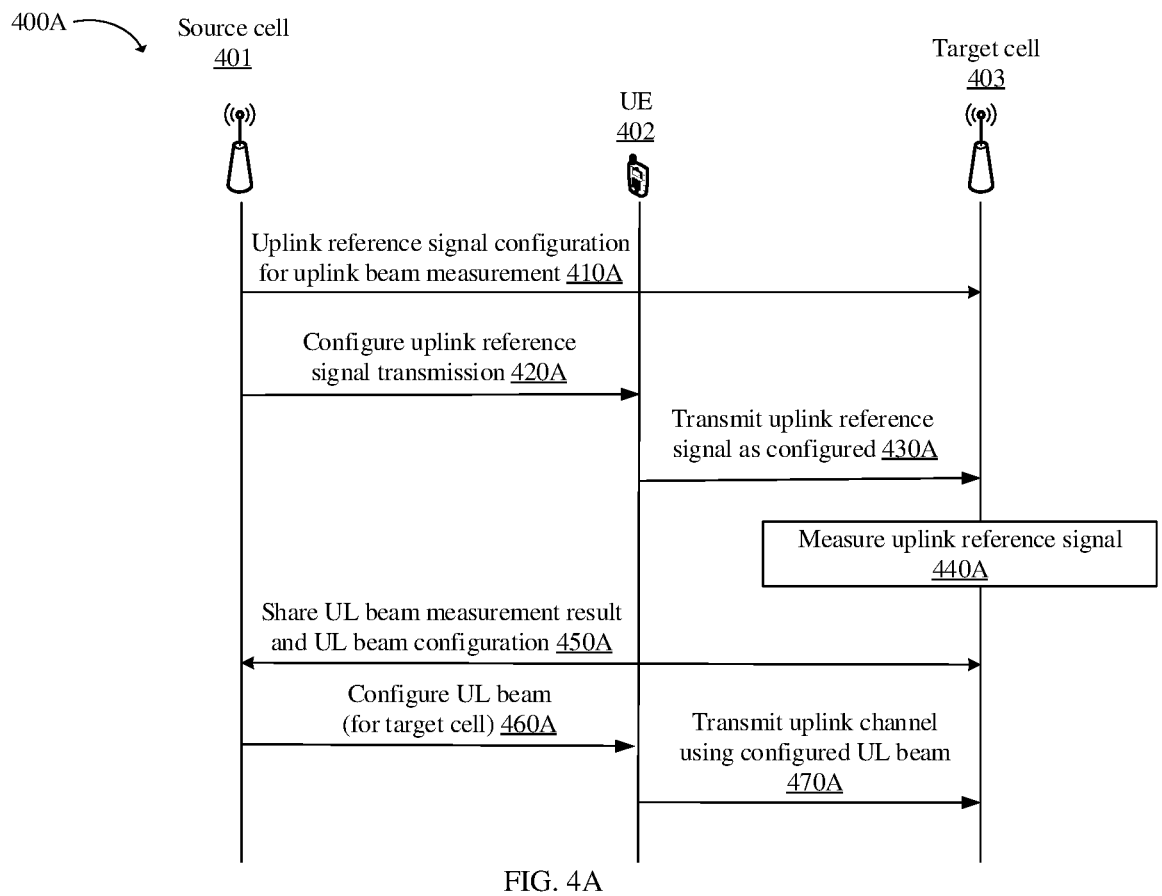
FIG. 4A is a flowchart illustrating a method of uplink beam management during a handover procedure of a UE according to an embodiment of the present disclosure.
Figure 4B:
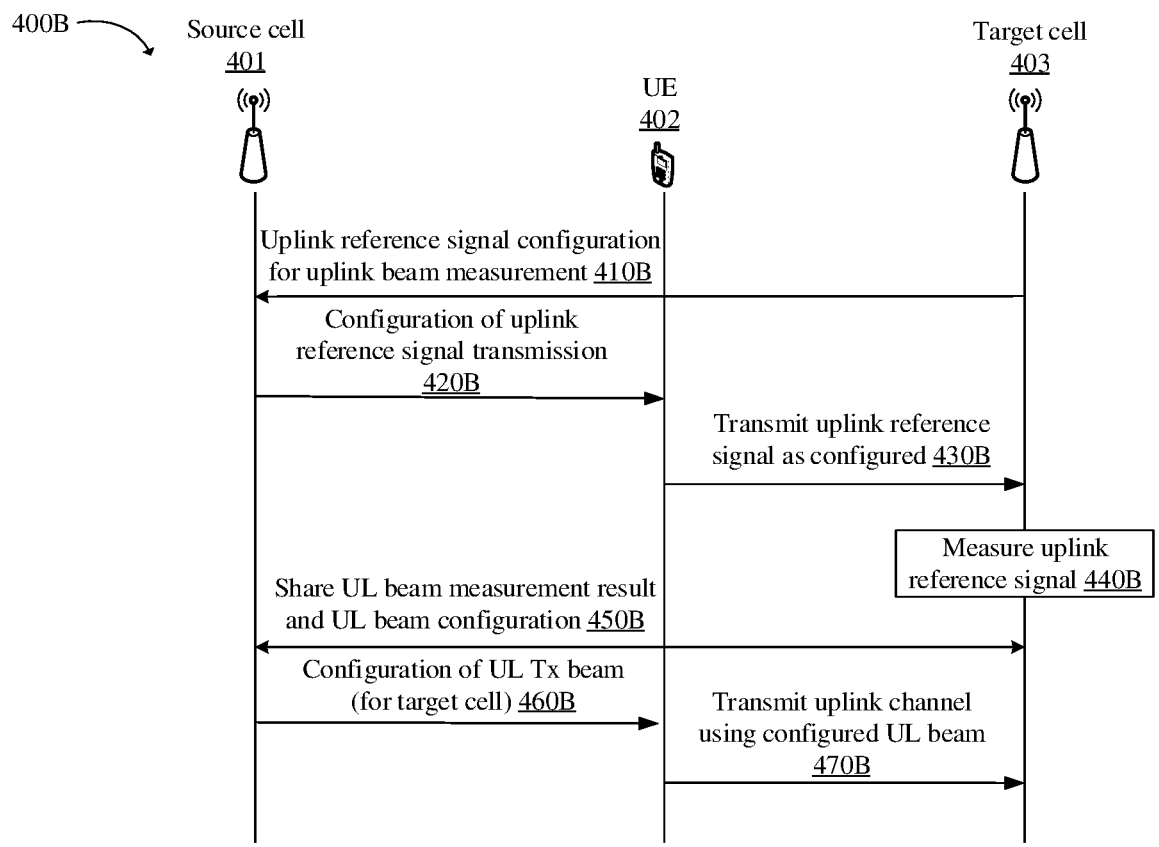
FIG. 4B is a flowchart illustrating a method of uplink beam management during a handover procedure of a UE according to an embodiment of the present disclosure.

FIG. 4A illustrates a method 400A of uplink beam management during a handover procedure of a UE according to an embodiment of the present disclosure. FIG. 4B illustrates a method 400B of uplink beam management during a handover procedure of a UE according to an embodiment of the present disclosure. FIG. 4A illustrates an example of uplink (UL) beam determination during handover according to methods in the present disclosure. In one method of an embodiment, the target cell can configure uplink reference signals for uplink beam measurement for the UE. The target cell can first send the configuration of uplink reference signal for uplink beam measurement to the source cell and then the source cell sends that configuration to the UE. FIG. 4B illustrates an example of UL (uplink) beam determination during handover according to methods the present disclosure. In one example, the source cell can forward that configuration message to the UE. In one example, the source cell can receive that configuration message and then configure the UE accordingly. After receiving the configuration, the UE can transmit the uplink reference signal accordingly.

In some embodiments, a method 400A of a handover operation performed by a user equipment (UE) 402 from a source cell 401 to a target cell 403 is illustrated in FIG. 4A. The method 400A of the handover operation includes: at an operation 410A, the source cell 401 transmits an uplink reference signal configuration for an uplink beam measurement to the target cell 403, at an operation 420A, the source cell 401 configures an uplink reference signal transmission to the UE 402, at an operation 430A, the UE transmits the uplink reference signal as configured to the target cell 403, at an operation 440A, the target cell 403 measures the uplink reference signal, at an operation 450A, the source cell 401 and the target cell 403 share UL beam measurement result and UL beam configuration, at an operation 460A, the source cell 401 configures an uplink beam for the target cell 403 to the UE 402, and at an operation 470A, the UE 402 transmits an uplink channel using the configured UL beam to the target cell 403.

In some embodiments, a method 400B of a handover operation performed by a user equipment (UE) 402 from a source cell 401 to a target cell 403 is illustrated in FIG. 4B. The method 400B of the handover operation includes: at an operation 410B, the source cell 401 transmits an uplink reference signal configuration for an uplink beam measurement to the target cell 403, at an operation 420B, the source cell 401 configures an uplink reference signal transmission to the UE 402, at an operation 430B, the UE transmits the uplink reference signal as configured to the target cell 403, at an operation 440B, the target cell 403 measures the uplink reference signal, at an operation 450B, the source cell 401 and the target cell 403 share UL beam measurement result and UL beam configuration, at an operation 460B, the source cell 401 transmits a configuration of an uplink beam for the target cell 403 to the UE 402, and at an operation 470B, the UE 402 transmits an uplink channel using the configured UL beam to the target cell 403.

In some embodiments, some UEs have beam correspondence. For them, an uplink transmit beam can be indicated by a downlink reference signal. The UE can derive the uplink transmit beam based on the correspondence between UE receive beams and transmit beams. In one embodiment, the source cell can receive a configuration of downlink reference signal for downlink beam measurement from the target cell and the target cell transmits those downlink reference signal through one or more transmit beams for downlink beam sweeping operation. The source cell can also configure the UE to measure those transmit beams from the target UE and then report one or more selected 'best' transmit beams of the target cell to the source cell. Then the source cell can configure one downlink reference signal to the UE as the transmit beam for the uplink transmission from the UE to the target cell. When receiving grant signaling from the source cell or target cell that grants an uplink transmission to the target cell, the UE transmits the uplink transmission with the Tx beam configured by the source cell according the uplink grant command.

Figure 4C:
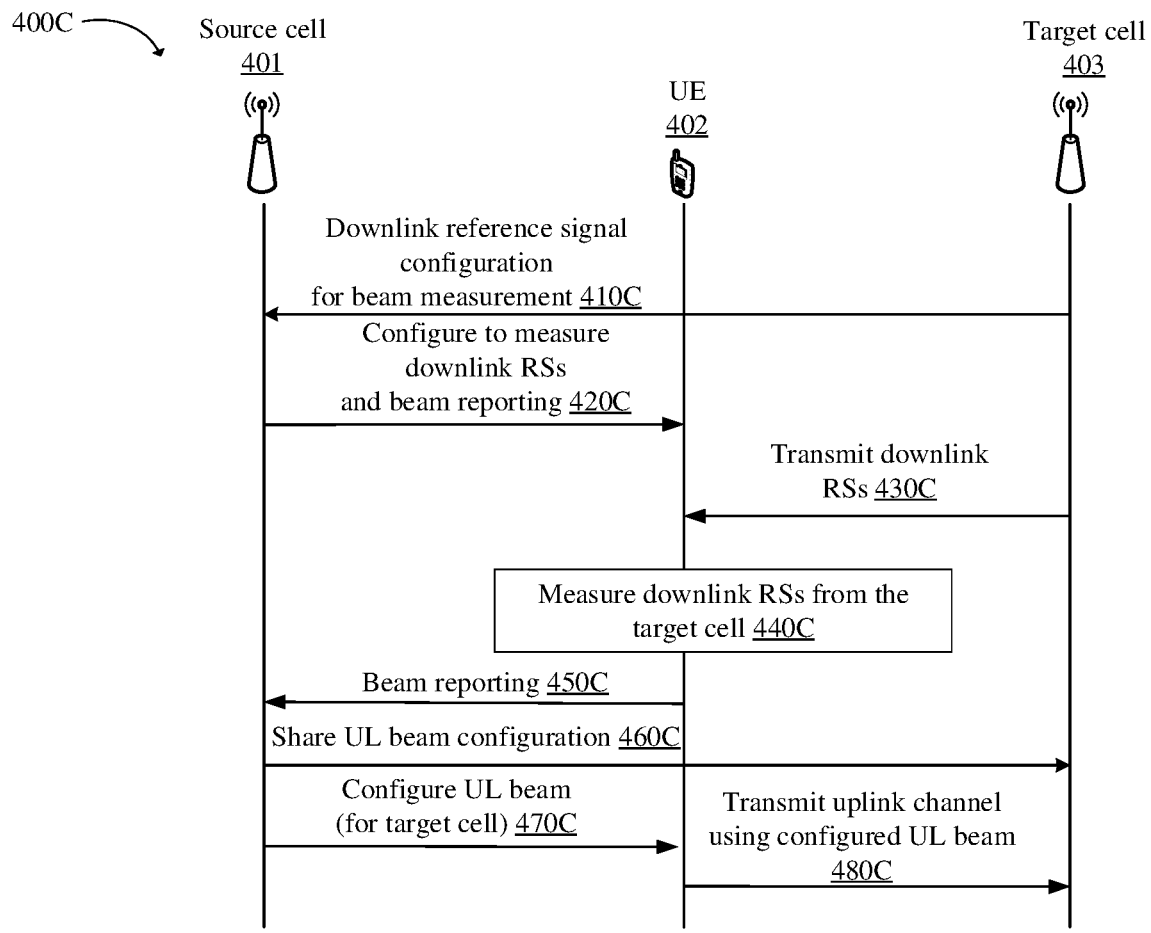
FIG. 4C is a flowchart illustrating a method of uplink beam management during a handover procedure of a UE according to an embodiment of the present disclosure.

FIG. 4C illustrates a method 400C of uplink beam management during a handover procedure of a UE according to an embodiment of the present disclosure. FIG. 4C illustrates an example of UL (uplink) beam determination during handover according to the methods in this invention. In one method of an embodiment, the source cell and the target cell can use SRS resource to configure the uplink transmit beam for a cell during handover. That method of the embodiment is applicable to both UE with beam correspondence and UEs without beam correspondence. The source cell can configure a first set of SRS resources to the UE, which is transmitted by the UE and will be measured by the target cell to determine the 'best' uplink transmit beam for uplink transmission from the UE to the target cell. The source cell can share the configuration of the first set of SRS resources for uplink beam management to the target cell to notify the target cell to measure those SRS resources. Then the source cell can send signaling command to the UE to trigger the transmission of the first set of SRS resources. In one example, if the SRS resource in the first set is periodic, the UE can transmit them as configured without waiting for activation or triggering signaling. In one example, if the SRS resource is the first set is semi-persistent, the source cell can send a activation command to the UE to activate the transmission of those SRS resources. In one example, if the SRS resource in the first set is aperiodic, the source cell can send one physical layer command, DCI, to the UE to trigger the transmission of those SRS resources. Then the UE can transmit the SRS resources in the first set as configured or indicated by the source cell. The target cell receives and measures those SRS resource transmissions according to the configuration information shared by the source cell. After measuring those SRS resource, the target cell can determine the 'best' uplink beam(s) for the connection between the UE and the target cell. The target cell can share the measurement results with the source cell.

In one example, the target cell can send the one or more SRS resource indicators and the corresponding measurement result, for example, a layer 1 reference signal received power (L1-RSRP) measurement, to the source cell. In one example, the target cell can send the measurement result, for example, L1-RSRP measurement of all the SRS resources in the first set. In one example, the target cell can send the indicator of one selected SRS resource to the source cell. The target cell and the source cell would use that SRS resource as the spatial relation reference for both PUCCH and PUSCH transmission from the UE to the target cell. In one example, the target cell can send a first indicator of one selected SRS resource to the source cell and the target cell and the source cell would use that SRS resource as the spatial relation reference for PUCCH transmission from the UE to the target cell. The target cell can also send a second indicator of one selected SRS resource and a third indicator of one selection SRS resource to the source cell and the source cell and the target cell would configure those SRS resources as the spatial relation source for the SRS resources configured for PUSCH transmission, for example codebook-based PUSCH transmission.

If the UL beam (i.e., spatial relation) for uplink transmission (PUCCH and PUSCH) from the UE to the target cell is determined by the source cell, the source cell shares the configuration of spatial relation for PUCCH and PUSCH to the target cell so that the target cell is able to use proper receive beam to receive the PUCCH and PUSCH transmission from the UE. The source cell can configure the uplink beam information for the PUCCH and PUSCH to the UE. For PUCCH resource sent to the target cell, the source cell can use RRC or MAC CE signaling to configure one SRS resource as the spatial relation reference to the UE. For PUSCH transmission, the source cell can first configure a set of SRS resources for codebook or non-codebook based PUSCH and then the source cell can configure the spatial relation source for those SRS resource. Particularly, for a PUSCH scheduled by DCI format 0_0, the UE would use the same uplink transmit beam as the one used for PUCCH transmission to the target cell.

The source cell can send command signaling to schedule PUSCH transmission from the UE to the target cell, for example the source cell can send DCI format to schedule a PUSCH transmission from the UE to the target cell. The source cell can configure a configured grant for PUSCH transmission for the UE to the target cell. In another example, the target cell can send command signaling to schedule PUSCH transmission from the UE to the target cell, for example the target cell can send DCI format to schedule a PUSCH transmission from the UE to the target cell. The source cell can configure a configured grant for PUSCH transmission for the UE to the target cell. For those PUSCH transmissions, the UE can transmit them according to the configure uplink transmit beam.

In some embodiments, a method 400C of a handover operation performed by a user equipment (UE) 402 from a source cell 401 to a target cell 403 is illustrated in FIG. 4C. The method 400C of the handover operation includes: at an operation 410C, the target cell 403 transmits a downlink reference signal configuration for beam measurement to the source cell 401, at an operation 420C, the source cell 401 configures to measure downlink RSs and beam reporting to the UE 402, at an operation 430C, the target cell 403 transmits downlink RSs to the UE 402, at an operation 440C, the UE 402 measures downlink RSs from the target cell, at an operation 450C, the UE 402 transmits a beam reporting to the source cell 401, at an operation 460C, the source cell 401 shares the UL beam configuration to the target cell 403, at an operation 470C, the source cell 401 configures an uplink beam for the target cell 403 to the UE 402, and at an operation 480C, the UE 402 transmits an uplink channel using the configured UL beam to the target cell 403.

Figure 5A:
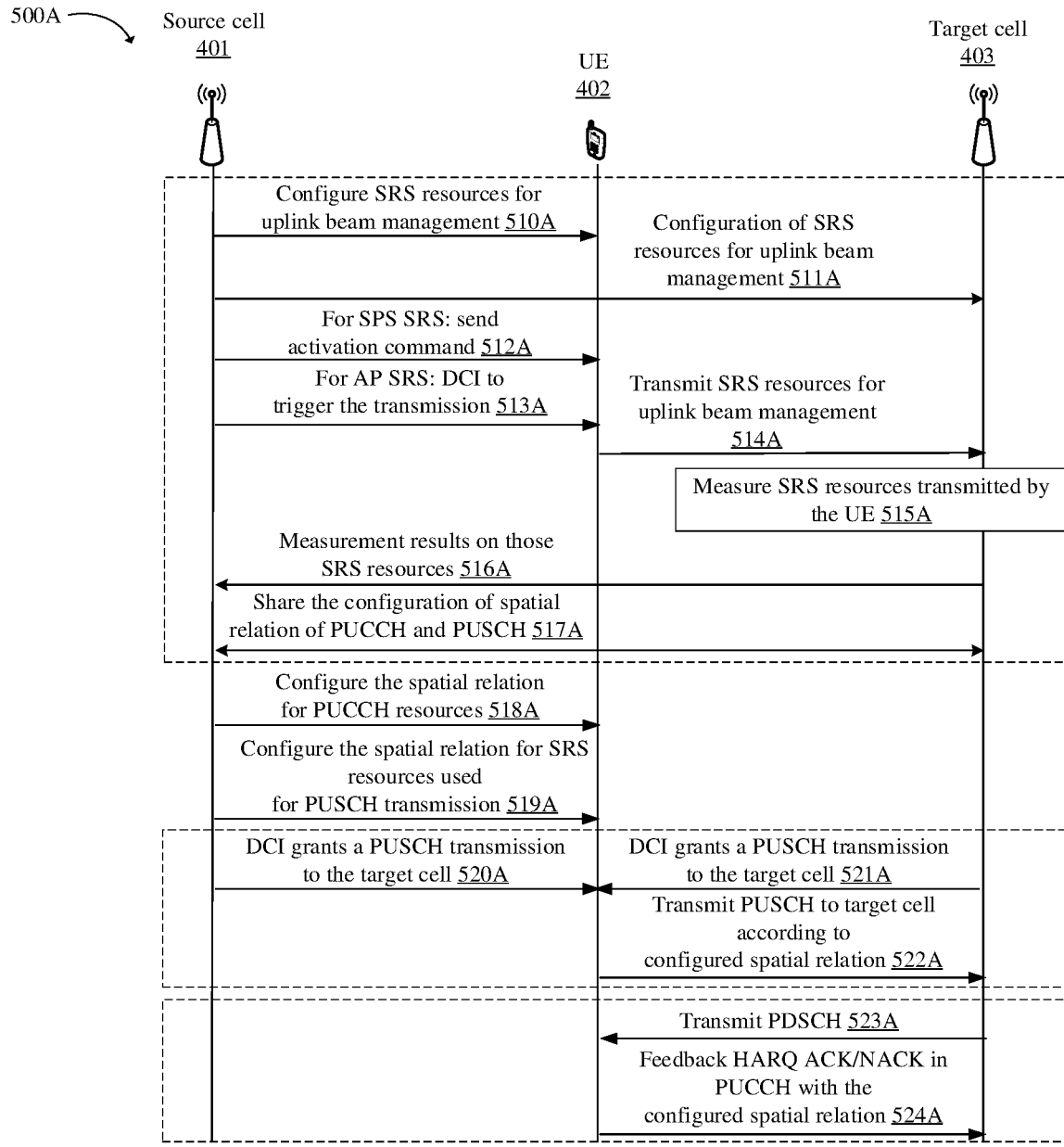
FIG. 5A is a flowchart illustrating a method of uplink beam management during a handover procedure of a UE according to an embodiment of the present disclosure.

FIG. 5A illustrates a method 500A of uplink beam management during a handover procedure of a UE according to an embodiment of the present disclosure. FIG. 5A illustrates an example of determining uplink transmit beam for connection to the target cell according the methods proposed in this invention. In one method, the target cell can configure the SRS resource for uplink beam management for the link between the UE and the target cell. In this example, the target cell configures a first set of SRS resources for uplink beam management and then the target cell can send the configuration of the first SRS resources to the UE through the source cell. The source cell can forward the configuration of the first set of SRS resources to the UE.

In some embodiments, a method 500A of a handover operation performed by a user equipment (UE) 402 from a source cell 401 to a target cell 403 is illustrated in FIG. 5A. The method 500A of the handover operation includes: at an operation 510A, the source cell 401 configures SRS resources for uplink beam management to the UE 402, at an operation 511A, the source cell 401 transmits a configuration of SRS resources for uplink beam management to the target cell 403, at an operation 512A, for SPS SRS: the source cell 401 sends activation command to the UE 402, at an operation 513A, for AP SRS: the source cell 401 sends DCI to trigger the transmission to the UE 402, at an operation 514A, the UE 402 transmits SRS resources for uplink beam management to the target cell 403, at an operation 515A, the target cell 403 measures SRS resources transmitted by the UE 402, at an operation 516A, the target cell 403 transmits measurement results on those SRS resources to the source cell 401, at an operation 517A, the source cell 401 and the target cell 403 share the configuration of spatial relation of PUCCH and PUSCH, at an operation 518A, the source cell 401 configures the spatial relation for PUCCH resources to the UE 402, at an operation 519A, the source cell 401 configures the spatial relation for SRS resources used for PUSCH transmission to the UE 402, at an operation 520A, the source cell 401 transmits a DCI that grants a PUSCH transmission to the target cell 403 to the UE 402, at an operation 521A, the target cell 403 transmits a DCI that grants a PUSCH transmission to the target cell 403 to the UE 402, at an operation 522A, the UE 402 transmits PUSCH to the target cell 403 according to configured spatial relation, at an operation 523A, the target cell 403 transmits PDSCH to the UE 402, and at an operation 524A, the UE 402 feedbacks HARQ ACK/NACK in PUCCH with the configured spatial relation to the target cell 403.

Figure 5B:
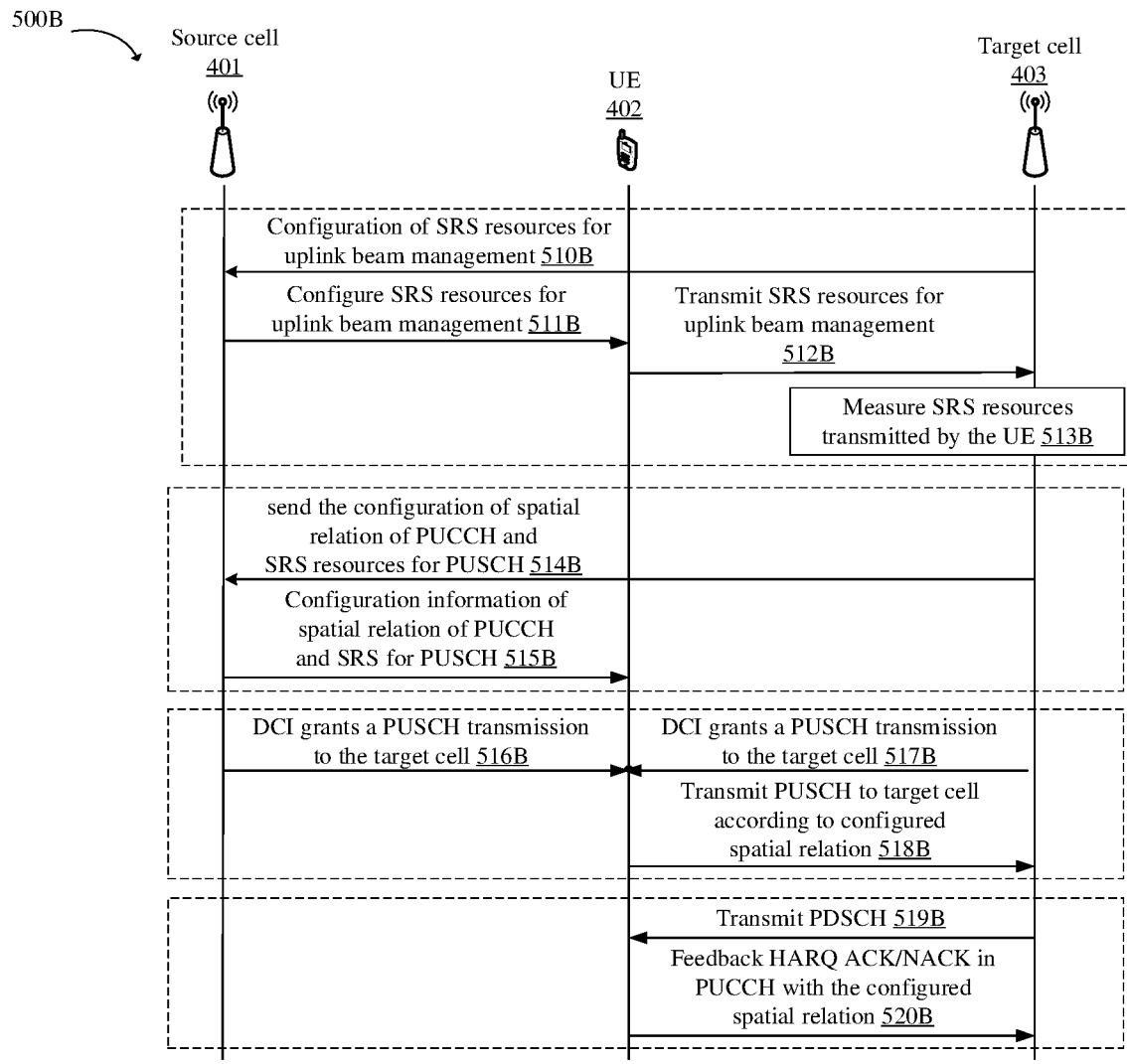
FIG. 5B is a flowchart illustrating a method of uplink beam management during a handover procedure of a UE according to an embodiment of the present disclosure.

FIG. 5B illustrates a method 500B of uplink beam management during a handover procedure of a UE according to an embodiment of the present disclosure. An example is illustrated in FIG. 5B. The target cell configures SRS resources for uplink beam management. The target cell first sends the configuration of the SRS resources for uplink beam management to the source cell and the source cell can forward that configuration to the UE. In one example, the configuration of SRS resources for uplink beam management can be part of the handover command signaling. After receiving the configuration of SRS resources for uplink beam management, the UE transmits the SRS resource for uplink beam management according to the configuration. Then the target cell can measure the transmission of those SRS resources. Based on measurement on SRS resources, the target cell can configure the spatial relation information for PUCCH transmission and spatial relation information for SRS resources that are used for PUSCH transmission. Then the target cell can send that configuration information to the UE through the source cell.

In some embodiments, a method 500B of a handover operation performed by a user equipment (UE) 402 from a source cell 401 to a target cell 403 is illustrated in FIG. 5B. The method 500B of the handover operation includes: at an operation 510B, the target cell 403 transmits a configuration of SRS resources for uplink beam management to the source cell 401, at an operation 511B, the source cell 401 configures SRS resources for uplink beam management to the UE 402, at an operation 512B, the UE 402 transmits SRS resources for uplink beam management to the target cell 403, at an operation 513B, the target cell 403 measures SRS resources transmitted by the UE 402, at an operation 514B, the target cell 403 sends the configuration of spatial relation of PUCCH and SRS resources for PUSCH to the source cell 401, at an operation 515B, the source cell 401 transmits a configuration information of spatial relation of PUCCH and SRS for PUSCH to the UE 402, at an operation 516B, the source cell 401 transmits a DCI that grants a PUSCH transmission to the target cell 403 to the UE 402, at an operation 517B, the target cell 403 transmits a DCI that grants a PUSCH transmission to the target cell 403 to the UE 402, at an operation 518B, the UE 402 transmits PUSCH to the target cell 403 according to configured spatial relation, at an operation 519B, the target cell 403 transmits PDSCH to the UE 402, and at an operation 520B, the UE 402 feedbacks HARQ ACK/NACK in PUCCH with the configured spatial relation to the target cell 403.

Figure 6:
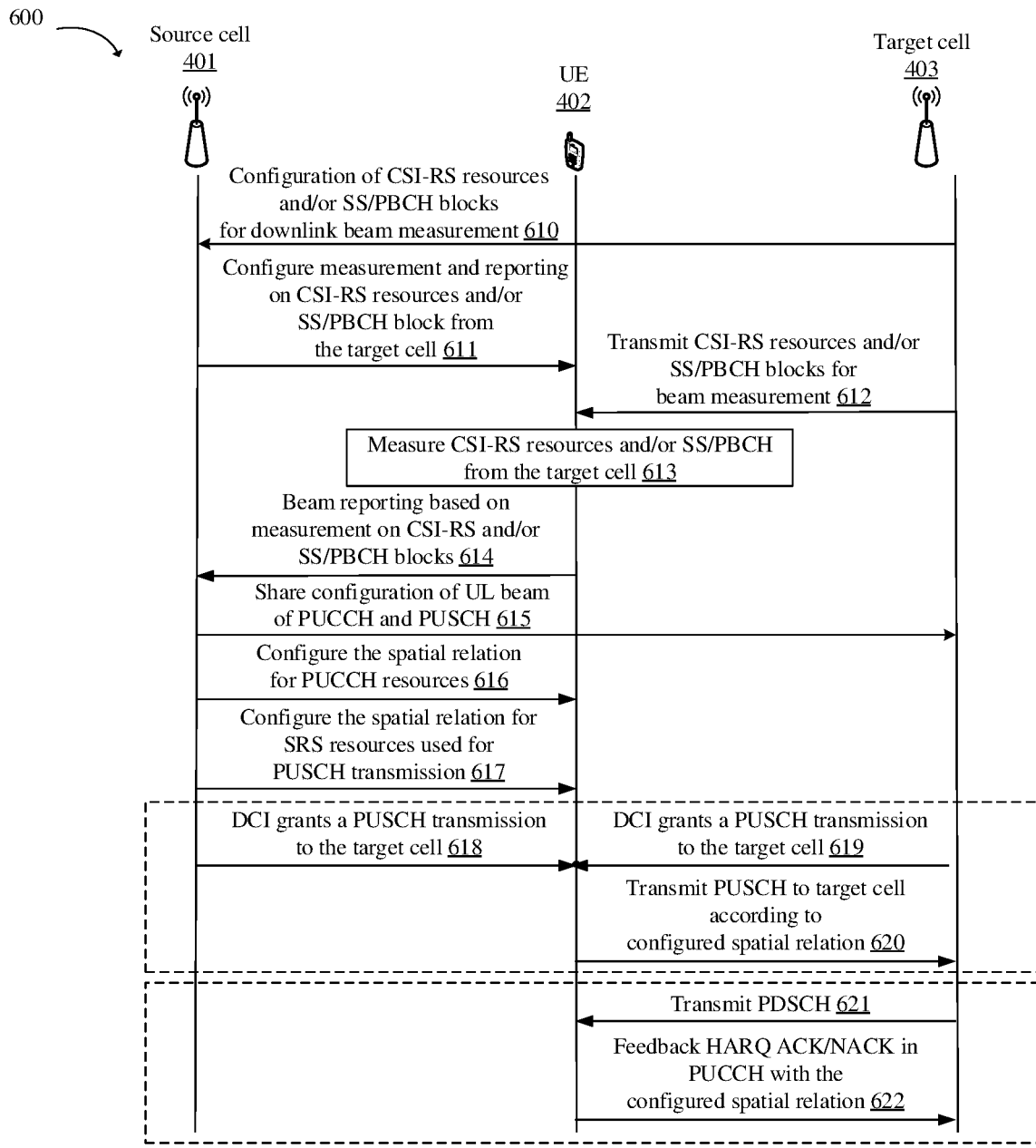
FIG. 6 is a flowchart illustrating a method of uplink beam management during a handover procedure of a UE according to an embodiment of the present disclosure.

FIG. 6 illustrates a method 600 of uplink beam management during a handover procedure of a UE according to an embodiment of the present disclosure. In one method, the source cell and the target cell can use downlink reference signal, CSI-RS resources and/or SS/PBCH blocks to configure the uplink transmit beam for a cell during handover. That method is applicable to UEs with beam correspondence. The target cell can formulate a set of CSI-RS resources and/or SS/PBCH blocks for downlink link beam training for the link between the UE and the target cell. The target cell can share the configuration of those CSI-RS resources and/or SS/PBCH blocks with the source cell. The source cell can configure the UE to measure those CSI-RS resources and/or SS/PBCH blocks sent by the target cell for downlink beam training. The UE can be requested to measure those CSI-RS resources and/or SS/PBCH blocks as configured by the source cell and then report the measurement results to the source cell. In one example, the UE can report one or more indicators of selected CSI-RS resources or SS/PBCH blocks and the corresponding measurement, for example L1-RSRP measurement or L1-SINR measurement. Based on the reporting, the system can determine the uplink beam for the uplink transmission (PUCCH or PUSCH) from the UE to the target cell. In one example, the source cell can determine the uplink beam (i.e., spatial relation for PUCCH and spatial relation for SRS resources configured for PUSCH) and then the source cell can share the configuration information of spatial relations with the target cell. In another example, the source cell can share the beam reporting with the target cell and the target cell determine the uplink beam (i.e., spatial relation for PUCCH and spatial relation for SRS resources configured for PUSCH) for the UE. After that, the target cell can send the determined spatial relation configuration to the source cell.

Then the source cell can configure the spatial relation for PUCCH and spatial relation for SRS resource(s) configured for PUSCH transmission (i.e., the SRS resource with set-use to be "codebook" or 'non-codebook'). Particularly, for a PUSCH scheduled by DCI format 0_0, the UE would use the same uplink transmit beam as the one used for PUCCH transmission to the target cell. The source cell can send command signaling to schedule PUSCH transmission from the UE to the target cell, for example the source cell can send DCI format to schedule a PUSCH transmission from the UE to the target cell. The source cell can configure a configured grant for PUSCH transmission for the UE to the target cell. In another example, the target cell can send command signaling to schedule PUSCH transmission from the UE to the target cell, for example the target cell can send DCI format to schedule a PUSCH transmission from the UE to the target cell. The source cell can configure a configured grant for PUSCH transmission for the UE to the target cell.

For those PUSCH transmission, the UE shall transmit them according to the configure uplink transmit beam.

FIG. 6 illustrates an example of determining uplink transmit beam for connection to the target cell according to the methods proposed in this invention. In some embodiments, a method 600 of a handover operation performed by a user equipment (UE) 402 from a source cell 401 to a target cell 403 is illustrated in FIG. 6. The method 600 of the handover operation includes: at an operation 610, the target cell 403 transmits a configuration of CSI-RS resources and/or SS/PBCH blocks for downlink beam measurement to the source cell 401, at an operation 611, the source cell 401 configures measurement and reporting on CSI-RS resources and/or SS/PBCH block from the target cell 403 to the UE 402, at an operation 612, the target cell 403 transmits CSI-RS resources and/or SS/PBCH blocks for beam measurement to the UE 402, at an operation 613, the UE 402 measures CSI-RS resources and/or SS/PBCH from the target cell 403, at an operation 614, the UE 402 transmits beam reporting based on measurement on CSI-RS and/or SS/PBCH blocks to the source cell 401, at an operation 615, the source cell 401 shares configuration of UL beam of PUCCH and PUSCH to the target cell 403, at an operation 616, the source cell 401 configures the spatial relation for PUCCH resources to the UE 402, at an operation 617, the source cell 401 configures the spatial relation for SRS resources used for PUSCH transmission to the UE 402, at an operation 618, the source cell 401 transmits a DCI that grants a PUSCH transmission to the target cell 403 to the UE 402, at an operation 619, the target cell 403 transmits a DCI that grants a PUSCH transmission to the target cell 403 to the UE 402, at an operation 620, the UE 402 transmits PUSCH to the target cell 403 according to configured spatial relation, at an operation 621, the target cell 403 transmits PDSCH to the UE 402, and at an operation 622, the UE 402 feedbacks HARQ ACK/NACK in PUCCH with the configured spatial relation to the target cell 403.

In summary, in some embodiments of the present disclosure, methods of uplink beam management for handover procedure are presented. According to the methods of some embodiments in this invention, a source cell configures the uplink beam sweeping through transmission of SRS resources to the UE and the source cell also notifies the configuration of SRS configuration to a target cell so that the target cell can measure the SRS resources transmitted by the UE to obtain the best beam for uplink transmission. Then the source cell configures uplink transmit beam for uplink transmission from the UE to the target cell. The target cell can also configure the SRS transmission and send the configuration of SRS transmission to the UE through the source cell. In another method of some embodiments proposed in this invention, the source cell configures the UE to measure beam sweeping downlink reference signal transmitted by the target cell and configure the UE to report measurement results to the source cell. The source cell then configures the Tx beam for uplink transmission from the UE to the target cell. The proposed methods of some embodiments enable a RACH-free handover procedure which reduces the latency of handover and the overhead of signaling and resource.

According to some embodiments of the present disclosure, during a handover from a source cell to a target cell, the uplink transmit beam for the UE to the target cell is determined based on the collaboration between the source cell and the target cell. The initial access and random access procedure that are necessary in handover implementation according to current design can be skipped. Thus, the latency and overhead of signaling and resource required for handover is reduced. A RACH-less handover procedure can be implemented. In the embodiment of the present disclosure, a user equipment (UE) and a method of uplink beam management during a handover procedure capable of providing a random access channel-free (RACH-free) operation, which can reduce latency and overhead of signaling and resource in a handover procedure are provided. The embodiment of the present disclosure is a combination of techniques/processes that can be adopted in 3GPP specification to create an end product.

Figure 7:
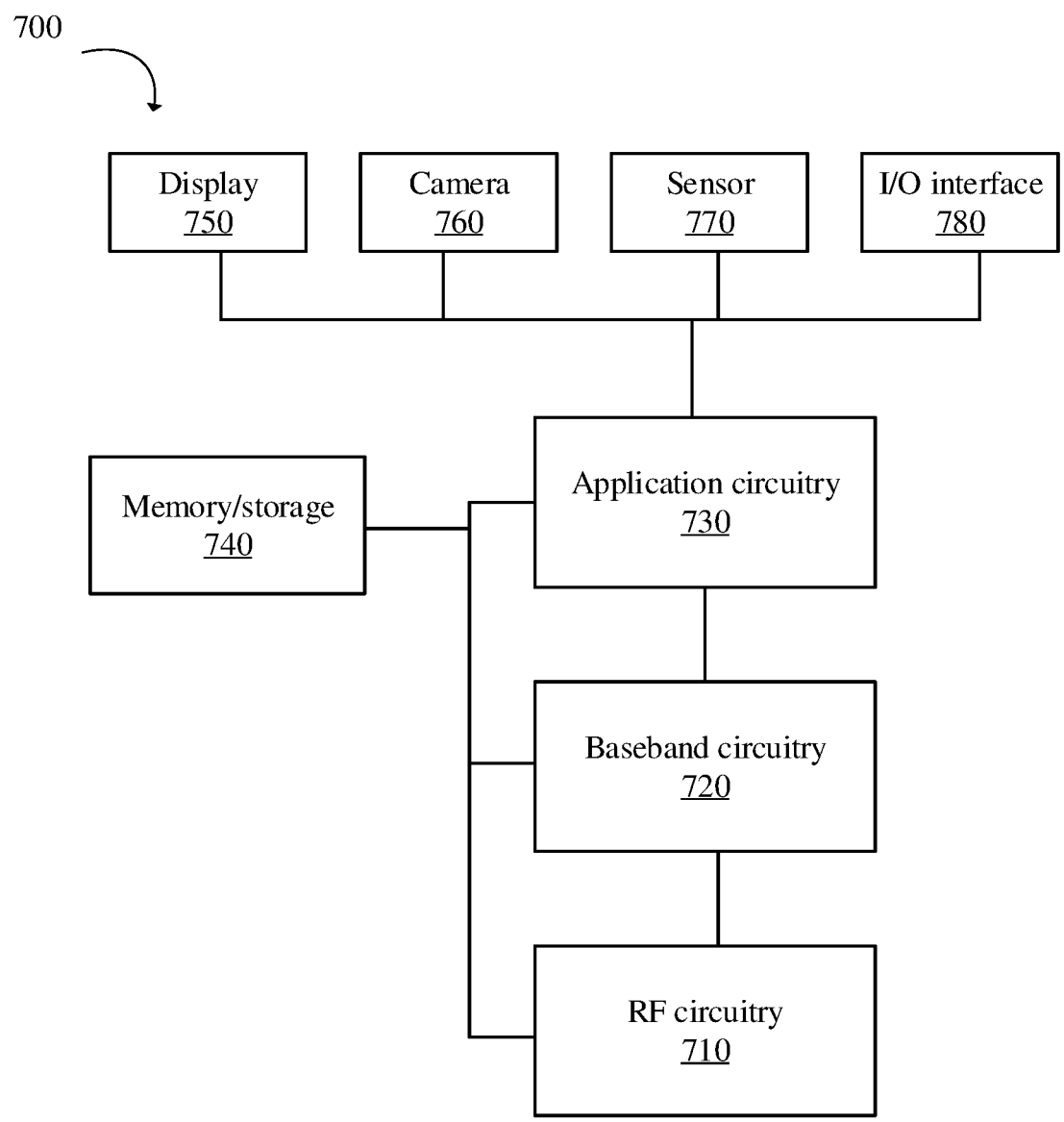
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units. If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes. While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of uplink beam management of a user equipment (UE), comprising:
being configured, by a source cell, an uplink transmit beam for an uplink transmission for a target cell; and
transmitting, to the target cell, the configured uplink transmit beam for the uplink transmission,
wherein the uplink transmit beam can be indicated by a downlink reference signal,
wherein the method further comprises: being configured, by the source cell, to measure the uplink transmit beam and then report one or more selected best transmit beams of the target cell to the source cell,
wherein the method further comprises: being configured, by the source cell, the downlink reference signal as the uplink transmit beam for the uplink transmission from the UE to the target cell;
wherein the method further comprises: being configured, by the source cell, an uplink beam sweeping through transmission of sounding reference signal (SRS)

resources before being configured, by the source cell, the uplink transmit beam for the uplink transmission for the target cell.

2. The method of claim 1, wherein being configured, by the source cell, the uplink beam sweeping through the transmission of the SRS resources comprises being configured, by the source cell, an uplink reference signal for an uplink transmit beam measurement.

3. The method of claim 2, wherein being configured, by the source cell, the uplink beam sweeping through the transmission of the SRS resources further comprises being indicated, by the source cell, to transmit, to the target cell, the configured uplink reference signal for the uplink transmit beam measurement.

4. The method of claim 2, further comprising transmitting, to the target cell, the configured uplink reference signal for the uplink transmit beam measurement after being configured, by the source cell, the uplink reference signal for the uplink transmit beam measurement.

5. A user equipment (UE) of uplink beam management, comprising:
a memory;
a transceiver; and
a processor coupled to the memory and the transceiver, wherein the processor is configured to:
be configured, by a source cell, with an uplink transmit beam for an uplink transmission for a target cell; and
control the transceiver to transmit, to the target cell, the configured uplink transmit beam for the uplink transmission,
wherein the uplink transmit beam can be indicated by a downlink reference signal,
wherein the processor is configured to be configured, by the source cell, to measure the uplink transmit beam and then report one or more selected best transmit beams of the target cell to the source cell,
the processor is configured to be configured, by the source cell, the downlink reference signal as the uplink transmit beam for the uplink transmission from the UE to the target cell; wherein the processor is configured to be configured, by the source cell, with an uplink beam sweeping through transmission of sounding reference signal (SRS) resources before the processor is configured to be configured, by the source cell, with the uplink transmit beam for the uplink transmission for the target cell.

6. The UE of claim 5, wherein the processor configured to be configured, by the source cell, with the uplink beam sweeping through the transmission of the SRS resources comprises the processor configured to be configured, by the source cell, with an uplink reference signal for an uplink transmit beam measurement.

7. The UE of claim 6, wherein the processor configured to be configured, by the source cell, with the uplink beam sweeping through the transmission of the SRS resources further comprises the processor configured to be indicated, by the source cell, to transmit, to the target cell, the configured uplink reference signal for the uplink transmit beam measurement.

8. The UE of claim 6, wherein the transceiver is configured to transmit, to the target cell, the configured uplink reference signal for the uplink transmit beam measurement after the processor configured to be configured, by the source cell, with the uplink reference signal for the uplink transmit beam measurement.

9. A non-transitory machine-readable storage medium having stored thereon instructions that, when executed by a user equipment (UE), cause the UE to perform operations of:
being configured, by a source cell, an uplink transmit beam for an uplink transmission for a target cell; and
transmitting, to the target cell, the configured uplink transmit beam for the uplink transmission,
wherein the uplink transmit beam can be indicated by a downlink reference signal,
wherein when the instructions are executed by the UE, the UE is caused to further perform an operation of: being configured, by the source cell, to measure the uplink transmit beam and then report one or more selected best transmit beams of the target cell to the source cell,
wherein when the instructions are executed by the UE, the UE is caused to further perform an operation of: being configured, by the source cell, the downlink reference signal as the uplink transmit beam for the uplink transmission from the UE to the target cell; wherein when the instructions are executed by the UE, the UE is caused to further perform an operation of: being configured, by the source cell, an uplink beam sweeping through transmission of sounding reference signal (SRS) resources before being configured, by the source cell, the uplink transmit beam for the uplink transmission for the target cell.

10. The non-transitory machine-readable storage medium of claim 9, wherein being configured, by the source cell, the uplink beam sweeping through the transmission of the SRS resources comprises being configured, by the source cell, an uplink reference signal for an uplink transmit beam measurement.

11. The non-transitory machine-readable storage medium of claim 10, wherein being configured, by the source cell, the uplink beam sweeping through the transmission of the SRS resources further comprises being indicated, by the source cell, to transmit, to the target cell, the configured uplink reference signal for the uplink transmit beam measurement.

12. The non-transitory machine-readable storage medium of claim 10, wherein when the instructions are executed by the UE, the UE is caused to further perform an operation of: transmitting, to the target cell, the configured uplink reference signal for the uplink transmit beam measurement after being configured, by the source cell, the uplink reference signal for the uplink transmit beam measurement.

* * * * *